May 10, 1927.
T. P. CHASE
1,627,834
VEHICLE BRAKE
Filed March 14, 1924
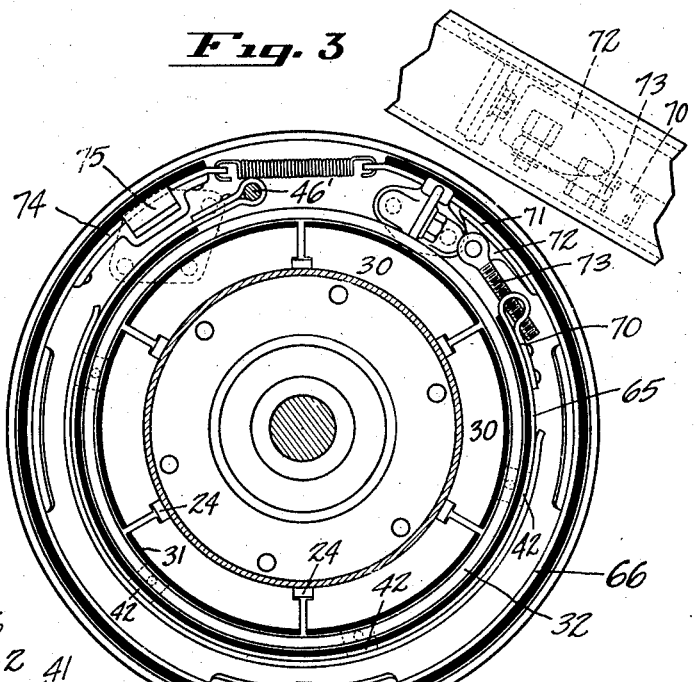
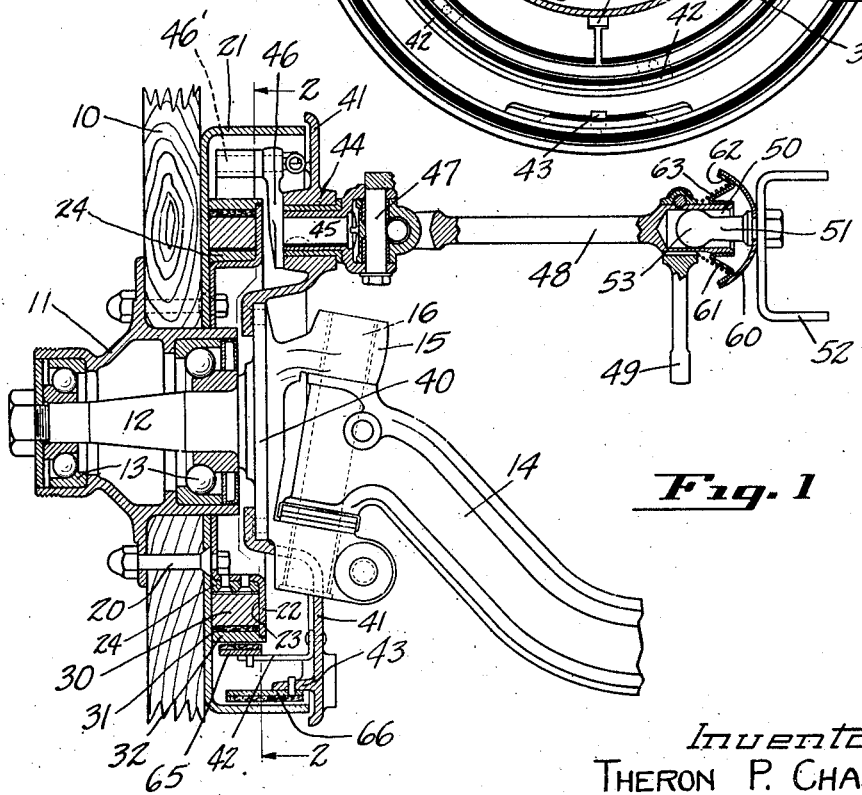
Inventor
THERON P. CHASE
By Blackmore, Spencer & Flich.
His Attorneys Patented May 10, 1927.

1,627,834

UNITED STATES PATENT OFFICE.

THERON P. CHASE, OF DAYTON, OHIO, ASSIGNOR TO GENERAL MOTORS CORPORATION, OF DETROIT, MICHIGAN, A CORPORATION OF DELAWARE.

VEHICLE BRAKE.

Application filed March 14, 1924. Serial No. 699,252.

This invention relates to vehicles, and is illustrated as embodied in an automobile having a driver-controlled servo-operated brake on each dirigible front wheel, each brake being arranged to release its wheel automatically when the wheel skids. An object of the invention is to provide a compact and efficient brake of this general character suited for use on automobiles manufactured in large quantities.

Having this object in view, and to prevent any substantial increase in pedal pressure in using four instead of two brakes, I arrange coaxial inner and outer drums to rotate with the wheel, one drum operating a novel servo device for a brake member engageable with the other drum. Preferably the servo device engages the inner drum, leaving the relatively large outer drum for the brake proper, to give a maximum area for the braking friction.

In one desirable arrangement, the servo drum is in the form of a floating ring frictionally clutched to the wheel by centrifugal means, so that if the wheel skids the ring is freed and the pressure on the brake is instantly and automatically relieved. In the illustrated arrangement, the ring is frictionally clutched to the wheel by weights keyed to the wheel to rotate therewith, but free to move radially under the influence of centrifugal force to engage the inside of the ring.

An important minor feature of the invention relates to the operation of the servo device by driver-controlled connections arranged automatically to vary the pressure according to the angular position of the wheel, and shown as arranged to relieve the pressure on the brake which is on the outside of a turn.

Other objects and features of the invention, including a novel support for the brake-operating shaft, and other desirable particular new constructions, will be apparent from the following description of one illustrative embodiment shown in the accompanying drawings, in which:

Figure 1 is a vertical sectional view of a dirigible wheel of a vehicle with the improved brakes;

Figure 2 is a sectional view on the line 2—2 of Figure 1;

Figure 3 is a detail view of a part of the device,

In the drawings 10 indicates a wheel having a hub 11 mounted upon a spindle 12 with the usual antifriction bearings 13. Spindle 12 is a part of a steering knuckle as shown and is mounted upon an axle 14 by means of a yoke portion 15 through which and through the end of the axle extends a king pin 16.

Secured to wheel 10, as by bolts 20, is a brake drum 21 and also a flanged plate 22 which latter, together with the web of drum 21, forms an annular groove or pocket 23, the bottom of which is provided with cleats 24, the purpose of which will be explained later.

Seated in groove 23 is a plurality of weights 30, six being shown. The weights are formed so as to fit snugly but loosely in the groove and are provided upon their outer surfaces with friction material 31, and are surrounded by and held in groove 23 by a ring 32 which is in turn held by flanged plate 22 and may be chamfered or stepped upon its edge to allow it to set down a short distance within groove 23. This ring 32 is not fixed in any way but floats in the upper portion of the groove.

Carried by a flange 40 upon the spindle 12 is a brake support and cover 41, provided with two brake band supports 42 and 43 and a boss 44 through which extends the shaft 45 of a brake operating crank member 46 connected to the band by a pin 46' and operable through the universal joint 47, shaft 48, and lever 49.

Carried by the brake supports 42 and 43, are two brake bands 65 and 66 respectively. One of these, 65, is adapted to act upon ring 32 and the other, 66, upon drum 21. These two brake bands 65 and 66 are connected to each other, the inner one 65, being adapted to be actuated by the member 46 while the outer one 66 is actuated by the inner. This is accomplished by connecting one end 70 of band 65 to an end 71 of the band 66 through lug 72, mounted thereon, and bolt 73 pivoted to the lug 72 and secured to end 70 of band 65. Band 65 is mounted in support 42 in such fashion as to permit some movement around the spindle. This movement will tend to expand band 66 whose other end 74 is anchored as at 75.

Shaft 48 may be supported in any suitable fashion but is preferably provided with a hollow end portion 50 into which extends a pin 51 mounted in one member 52 of the usual spring-supported chassis frame. The pin 51 is provided with an enlarged spherical head 53 slidably fitting into hollow portion 50. Such an arrangement gives universal action to the joint and also permits motion of the shaft lengthwise. The joint may also be provided with a cover such as is shown. This cover may consist of a hemispherical cup 60 surrounding and mounted upon pin 51. Coacting with cup 60 is a shield 61 mounted upon shaft 48 and provided with an upturned flange 62 adapted to bear against the inside of cup 60. A spring 63 is used to press the shield 61 against cup 60 to maintain a tight dust proof joint.

The operation of the device is as follows: Assuming a rotation of the wheel clockwise (Figure 2), rapid movement tends to throw weights 30 outward and, through friction surfaces 31, grip the inner surface of ring 32. The more rapid the movement, the tighter the gripping action. When this is taking place, if the brake is to be applied, the member 46 is operated to draw band 65 against ring 32. Such action causes band 65 to be carried around with the ring 32, weights 30, and wheel 10, tending to drag with it band 66. The latter being anchored at 75, expands against drum 21 and supplies braking effort to the wheel. When the wheel slows down the grip between ring 32 and weights 30 becomes less tight and at slow speeds will slip.

When at a standstill brake 66 may be applied by operating member 46 in same manner to grip ring 32. The latter, being floating, will be rotated with little or no resistance and the end 71 of band 66 moved sufficiently to expand the latter against drum 21.

It will be noted that the vertical axis of universal joint 47 intersects the axis of the king pin at an acute angle. As is well known, this causes an automatic action in rounding a corner, serving to relieve the pressure on the outer brake to guard against any possibility of locking both front wheels at that time.

While one illustrative embodiment of the invention has been described in detail, it is not my intention to limit its scope to that particular embodiment, or otherwise than by the terms of the appended claims.

I claim:

1. A brake comprising, in combination, a drum, a floating ring inside the drum, centrifugal means frictionally engaging the ring to cause it to rotate with the drum, a driver-controlled servo device arranged to engage and be operated by the ring, and a brake member arranged to be moved by the servo device into engagement with the drum.

2. A wheel having a brake comprising, in combination, a drum rotating with the wheel, a floating ring inside the drum, centrifugally-operated means rotating with the wheel and frictionally clutching the inside of the ring, a driver-controlled servo device engageable with the outside of the ring and permitted a limited angular movement with the wheel and ring, and a brake member arranged to be moved by angular movement of the servo device into frictional engagement with the drum.

3. A wheel having a brake comprising, in combination, a drum rotating with the wheel, a floating ring inside the drum, centrifugally-operated means rotating with the wheel and frictionally clutching one side of the ring, a driver-controlled servo device engageable with the other side of the ring and permitted a limited angular movement with the wheel and ring, and a brake member arranged to be moved by angular movement of the servo device into frictional engagement with the inside of the drum.

4. A wheel having a brake comprising, in combination, a drum rotating with the wheel, a floating ring inside of and coaxial with respect to the drum, weights keyed to rotate with the wheel but permitted to move centrifugally radially into clutching engagement with the inside of the ring, a driver-controlled servo device engageable with the outside of the ring and permitted an angular movement with the ring, and a brake member moved by angular movement of the servo device into frictional retarding engagement with the drum.

5. A wheel having a brake comprising, in combination, coaxial inner and outer drums rotating with the wheel, a flexible friction servo band engageable with the outside of the inner drum, a friction brake band anchored at one end and expansible to engage the inside of the outer drum, a driver-operated member connected to one end of the servo band to move it into frictional engagement with its drum, and a connection between the other end of the servo band and the free end of the brake band.

6. A wheel having a brake comprising, in combination, coaxial inner and outer drums rotating with the wheel, a flexible friction band engageable with the outside of the inner drum, a flexible friction band expansible to engage the inside of the outer drum, a driver-operated member connected to one end of one band to move it into frictional engagement with its drum, and a connection between the other end of said band and the free end of the other band, said other band being anchored at its opposite end.

In testimony whereof I affix my signature.

THERON P. CHASE.